United States Patent [19]

Higgins et al.

[11] Patent Number: 4,541,360
[45] Date of Patent: Sep. 17, 1985

[54] DISPOSABLE ANIMAL LITTER BOX

[76] Inventors: Queenie D. Higgins; Dana R. Garrison, both of 1221 SW. 92, Oklahoma City, Okla. 73139

[21] Appl. No.: 586,106

[22] Filed: Mar. 5, 1984

[51] Int. Cl.$^4$ ............................................. A01K 23/00
[52] U.S. Cl. ...................................................... 119/1
[58] Field of Search ................... 119/1; 229/31 R, 33, 229/31 FS, 32, 52 B; 206/620, 621, 626, 634

[56] References Cited

U.S. PATENT DOCUMENTS

| | | | |
|---|---|---|---|
| 3,696,990 | 10/1972 | Dewhurst | 206/620 |
| 4,164,314 | 8/1979 | Edgar | 119/1 |
| 4,209,945 | 7/1980 | Dent et al. | 119/1 X |
| 4,271,787 | 6/1981 | Wellman et al. | 119/1 |
| 4,391,405 | 7/1983 | Drinon | 229/31 R |
| 4,420,080 | 12/1983 | Nakamura | 206/621 |

Primary Examiner—Hugh R. Chamblee

[57] ABSTRACT

A disposable animal litter box having a substantially fluid-tight bottom container and a cover member supported by the container is provided. The bottom container is provided with a bottom panel, substantially parallel container end walls connected to opposite side edges of the bottom panels so as to be substantially normally disposed to the plane of the bottom panel, substantially parallel container side walls connected to the other two opposite edges of the bottom panel so as to be substantially normally disposed to the plane of the bottom panel and so as to extend in the same direction as the container end walls, and foldable corners interconnecting the end portions of the container end walls to the adjacently disposed end portions of the container side walls. The cover member is provided with a selectively removable portion so as to define an opening therein and provide a lip in the cover member encompassing the opening, the removable portion being positionable within the opening for frictionally engaging the lip of the cover member for disposal of the animal litter box and its contents.

9 Claims, 5 Drawing Figures

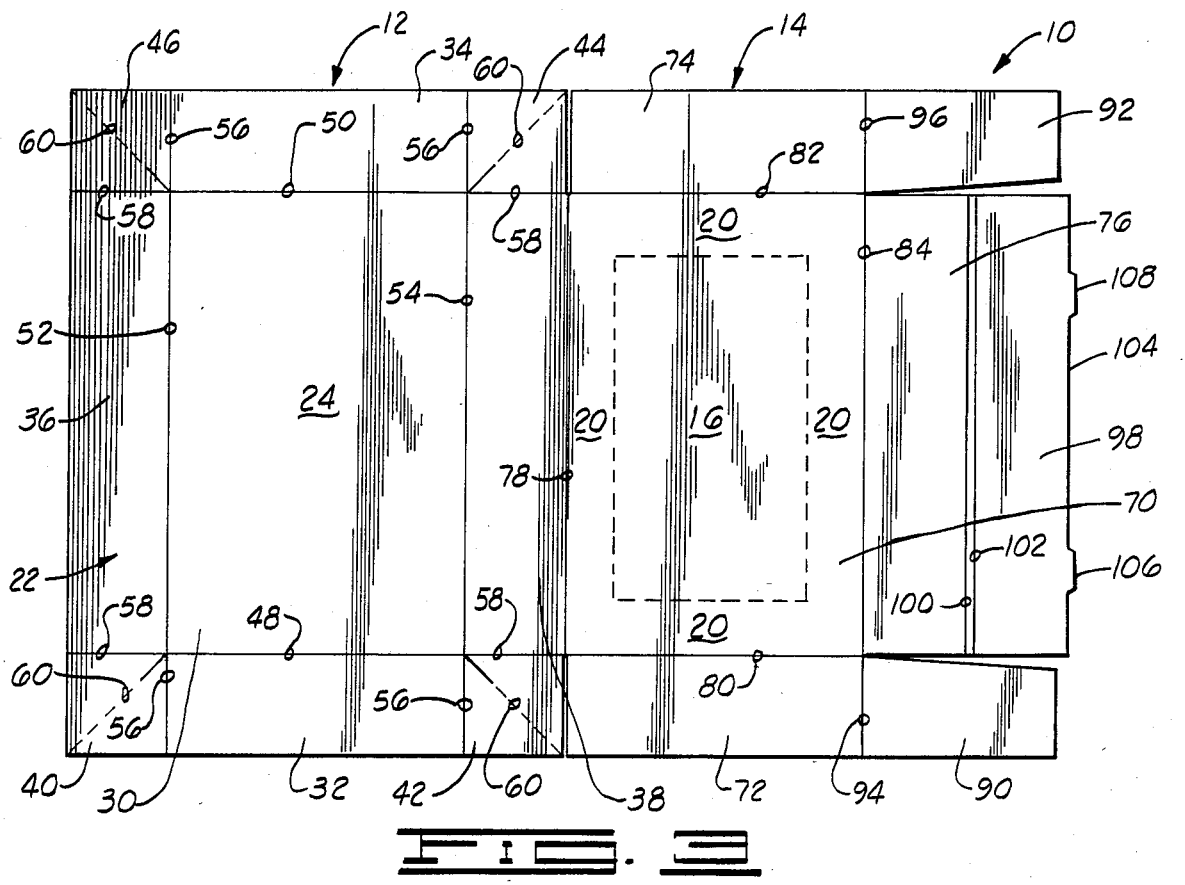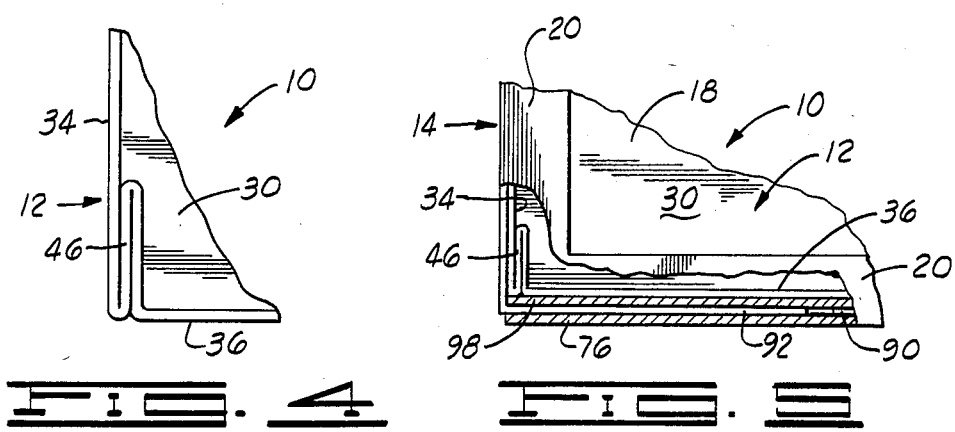

DISPOSABLE ANIMAL LITTER BOX

BACKGROUND OF THE INVENTION

1. Field of the Invention

The present invention relates to containers and more particularly, but not by way of limitation, to a disposable animal litter box for use with granular materials to collect and dispose of a cat's waste.

2. Description of the Prior Art

Domestic animals, such as cats, frequently use litter containers filled with various kinds of granular material to perform their natural instinct of burying their feces and to provide an easy way to collect and dispose of the cat's waste. These litter containers must be periodically emptied and cleaned in order to prevent a strong stench and odor from occuring. The cleaning of a litter container is usually an objectionable task, and such containers are often difficult to clean because the cat's urine filters through the litter and settles in the bottom of the container. This results in the litter becoming moist or saturated, which in turn makes the removal of the litter from the container a tedious and unpleasant task.

In an effort to overcome the unpleasant task of emptying litter from a container, disposable containers have been tried and used on a limited basis. However, the prior art disposal containers have generally possessed certain inherent disadvantages, such as instability and unreliability of the container to retain the urine and particulate matter, especially when the cat is burying its feces. Thus, new and improved disposable litter containers which overcome the before-mentioned inherent deficiencies of the prior art devices would be highly desirable.

SUMMARY OF THE INVENTION

The present invention provides an improved disposable animal litter box having a fluid-tight bottom container and a cover member supported by the bottom container, the bottom container and cover member cooperating to provide a stable, reliable container to retain urine and particle matter within the confines of the litter box. The substantially fluid-tight bottom container comprises a bottom panel, substantially parallel container end walls connected to two opposite edges of the bottom panel so as to be substantially normally disposed to the plane of the bottom panel, substantially parallel container side walls connected to the other two opposite edges of the bottom panel so as to be normally disposed to the plane of the bottom panel and extend therefrom in the same direction as the container end side walls, and foldable corners interconnecting the adjacently disposed end portions of the container end wall and the container side walls of the bottom container to render the bottom container substantially fluid-tight. The cover member, which is supported by the bottom container is provided with a selectively removable portion so as to define an opening within the cover member and provide a lip in the cover member encompassing the opening, the removable portion being positionable within the opening for frictionally engaging the lip of the cover member defining the opening when disposing of the animal litter box and the contents therein.

An object of the present invention is to provide a disposable animal litter box which is simple to open, easy to place in use and which is economical to manufacture.

Another object of the present invention, while achieving the above stated object, is to provide an improved animal litter box which is sturdy in construction and capable of retaining the urine and moist litter within the box without leakage through the material from which the box is constructed or through the folds or corners of the box containing litter.

Other objects, advantages and features of the present invention will become apparent upon reading of the following description as read in conjunction with the drawings and appended claims.

BRIEF DESCRIPTION OF THE DRAWINGS

FIG. 3 is a plan view of a panel from which the disposable litter box of the present invention is constructed showing score lines where the panel is folded to make the disposable litter box.

FIG. 4 is a fragmentary, partial cutaway view of the fluid-tight bottom container portion of the disposable animal litter box of the present invention illustrating the foldable corner of FIG. 1 for interconnecting adjacent side portions of the bottom container.

FIG. 5 is a fragmentary, partial cutaway view of the cover member of the disposable animal litter box of the present invention illustrating the interconnection of one of the cover end walls to the cover side wall.

DESCRIPTION

Figure 1:
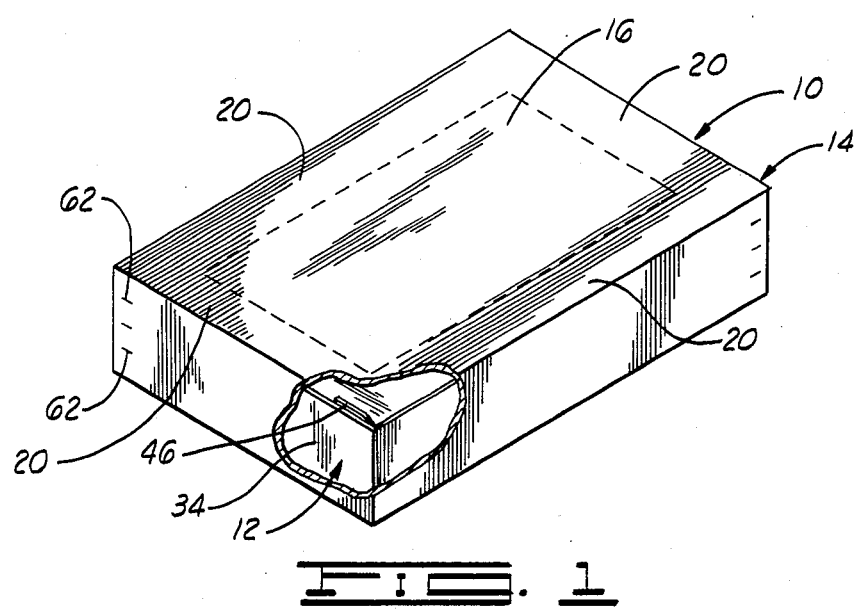
FIG. 1 is a partial cutaway, perspective view of an animal litter box constructed in accordance with the present invention and illustrating a foldable corner for interconnecting adjacent sides of a fluid-tight bottom container portion of the animal litter box.

Referring more specifically to the drawings, numeral 10 designates a disposable animal litter box constructed in accordance with the present invention. The disposable animal litter box 10 comprises a substantially fluid-tight bottom container 12 and a cover member 14. The cover member 14, which is supported by the bottom container 12, is provided with an enlarged, centrally disposed, selectively removable portion 16. Upon removal of the removable portion 16 from the cover member 14 an opening 18 is formed in the cover member 14 so as to provide a lip 20 in the cover member 14 around the opening 18. The removable portion 16 of the cover member 14 is defined by perforations so that upon application of a force to the removable portion 16, either in a downwardly or upwardly directed direction, the removable portion 16 can be separated from the cover member 14 to provide the opening 18 therein. The removable portion 16 can be repositioned within the opening 18 for disposal of the animal litter box 10 and its contents. The removable portion 16 is held in place upon repositioning same in the opening 18 by frictional engagement of the edges of the removable portion 16 with the edges of the lip 20 of the cover member 14 defining the opening 18.

The bottom container 12 and the cover member 14 are desirably fabricated as a unitary component from a panel 22 as illustrated in FIG. 3. The panel 22 is treated on its internal surface 24 with a urine or water repellant material, such as wax. The panel 22 can be fabricated of any suitable material, such as pressboard, paperboard or cardboard.

Figure 2:
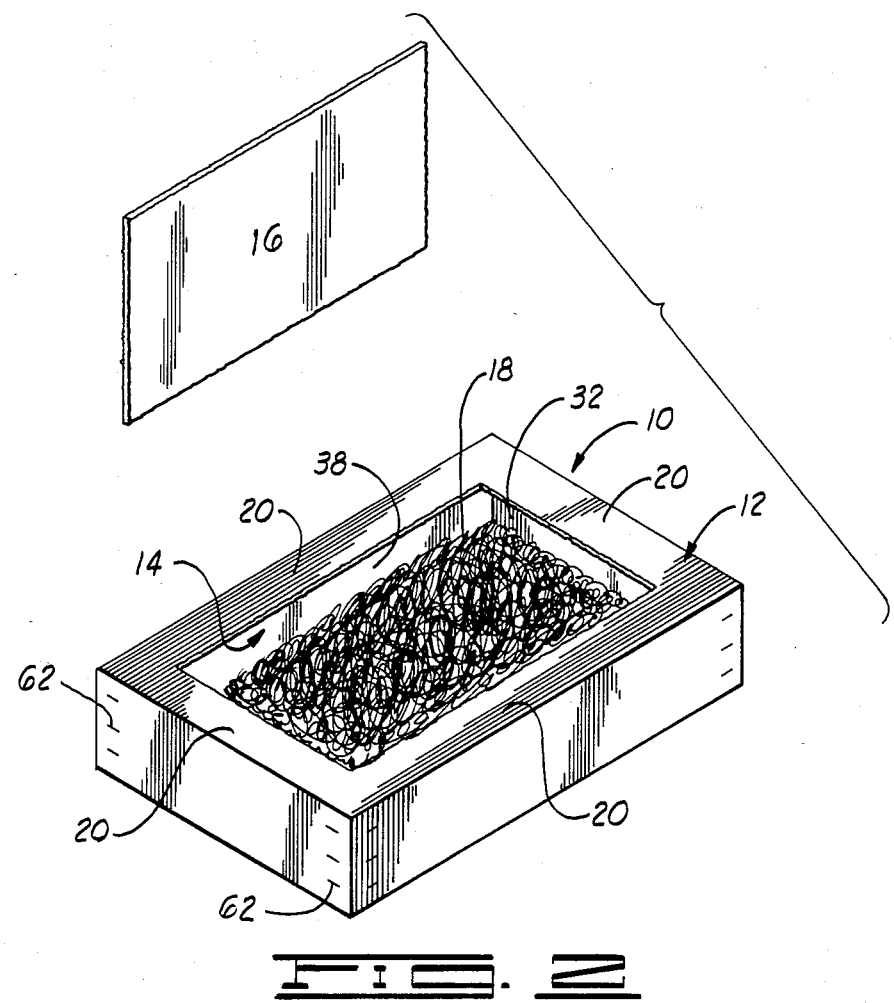
FIG. 2 is a perspective view of the disposable animal litter box of the present invention having a selectively removable portion of a cover panel removed therefrom and illustrating litter positioned within the fluid-tight bottom container portion.

Referring more specifically to FIGS. 1, 2 and 3, the bottom container 12 of the disposable animal litter box 10 (illustrated as having a rectangular configuration) comprises a bottom panel 30, a pair of container end walls 32, 34, container side walls 36, 38, and a plurality of foldable corner members 40, 42, 44 and 46.

In the assembled position of the bottom container 12 the container end walls 32, 34 (i.e. the bottom panel end walls) are folded upwardly so as to be in a substantially parallel relationship with each other and normally disposed to the plane of the bottom panel 30. Similarly, the container side walls 36, 38 (i.e. the bottom panel side walls) are folded upwardly in the same direction as the container end walls 32, 34 so that the container side walls 36, 38 are disposed in a substantial parallel relationship and substantially normal to the plane of the bottom panel 30. The container end wall 32 is attached to the bottom panel 30 along a score line 48 which defines an end edge of the bottom panel 30; and the container end wall 34 is attached to the bottom panel 30 along a score line 50 which defines an opposed end edge of the bottom panel 30. Similarly, the container side wall 36 is attached to the bottom panel 30 along a score line 52 which defines a side edge of the bottom panel 30; and the container side wall 38 is attached to the bottom panel 30 along a score line 54 which defines an opposed side edge of the panel 30.

The four foldable corners 40, 42, 44 and 46, which interconnect the end portions of the container end walls 32, 34 with the adjacently disposed end portions of the container side walls 36, 38 of the bottom container 12 to form the substantially fluid-tight bottom container 12 are defined along their inner edges by score lines 56 and 58. At least one diagonal score line, such as score line 60, is provided in each of the foldable corners, 40, 42, 44 and 46 for facilitating folding of the corners 40, 42, 44, and 46 inwardly when the container end walls 32, 34 and the container side walls 36, 38 are folded upwardly. The score lines 60 provided in each of the corner members 40, 42, 44 and 46 can extend the full diagonal length of each of the corner members 40, 42, 44 and 46; or the score lines 60 can extend only a portion of the diagonal distance, coming within the intersection of the score lines 56, 68, the remainder of the diagonal distance of each of the corner members 40, 42, 44 and 46 being provided with perforations which enhance the folding of each of the corner members.

The corners 40, 42, 44 and 46, when folded inwardly are desirably disposed substantially adjacent the container end walls 32, 34, such as corner member 46 illustrated in FIGS. 1, 4 and 5 which is disposed substantially adjacent container end wall 34. The folded corner members 40, 42, 44 and 46 can be secured to the container end walls 32, 34 by any suitable means, such as glue, tape or staples 60 as illustrated in FIGS. 1 and 2. It should be noted that the corners 40, 42, 44 and 46, in addition to connecting the end walls 32, 34 of the bottom container 12 to the container side walls 36, 38, serves as an internal support and strengthening element for the lip 20 of the cover member 14 when the cover member 14 is disposed over the bottom container 12.

The cover member 14 of the animal litter box 10 forms an upper closure for the bottom container 12 (as shown in FIG. 1) forming the lip 20 defining the opening 18 when the selectively removable portion 16 of the cover member 14 has been removed therefrom (as shown in FIG. 2). The cover member 14 comprises a cover panel 70, cover end walls 72, 74 and cover side wall 76. The cover panel 70, which contains the removable portions 16 for defining the opening 18 and the encompassing lip 20 of the cover member 14, is attached to the container side wall 38 along a score line 78 which defines an upper edge of the container side wall 38.

In the assembled position of the cover member 14 the cover end walls 72, 74 are folded downwardly so as to be in a substantially parallel relationship with each other and normally disposed to the plane of the cover panel 70. Similarly, the cover side wall 76 is folded downwardly, (i.e. in the same direction as the cover end walls 72, 74) so as to be substantially normally disposed to the plane of the cover panel 70. The cover end wall 72 is attached to the cover panel 70 along a score line 80 which defines an end edge of the cover panel 70; and the cover side wall 74 is attached to the cover panel 70 along a score line 82 which defines an opposed end of the cover panel 70. Similarly, the cover side wall 76 is attached to the cover panel 70 along a score line 84 which defines a side edge of the cover panel 70.

Referring now to FIGS. 3 and 5, the cover end wall 72 is provided with a flap portion 90 extensive from the end adjacent the cover side wall 76; and the cover end wall 74 is provided with a flap portion 92 extensive from the end adjacent the cover side wall 76. The flap portion 90 is attached to the cover end wall 72 along a score line 94 which defines the end of the cover end wall 72 adjacent the cover side wall 72; and the flap portion 92 is attached to the cover end wall 74 along a score line 96 which defines the end of the cover end wall 74 adjacent the cover side wall 76. Thus, in the assembled position of the cover member 14 the flap portions 90, 92 of the cover end wall 72, 74, respectively, are folded inwardly to extend beneath at least a portion of the lip 20 of the cover panel 70 so that the flap portions 90, 92 are disposed substantially adjacent the cover side wall 76.

The cover side wall 76 is provided with a locking portion 98. The locking portion 98 is attached to a distal end of the cover side wall 76 along a score line 100 which defines the distal end or edge of the cover side wall 76. A score line 102 is disposed a select distance from the score line 100, and disposed substantially parallel thereto, the select distance substantially corresponding to the thickness of the flap portions 90, 92 of the cover end walls 72, 74, respectively. Further, the locking portion 98 is dimensioned such that when the locking portion 98 is foldable along the length of the cover side wall 76 via the score lines 100, 102, the locking portion 98 is foldable over the corner end wall flap portions 90, 92 when the flap portion 90, 92 are in the folded position (as shown in FIG. 5) and the locking portion 98 is retained in a locked position substantially adjacent the flap portions 90, 92 by frictional engagement of a distal end 104 of the locking portion 98 with the portion of the lip 20 of the cover panel 70 disposed substantially adjacent the cover side wall 76. To ensure the desired frictional engagement of the distal end 104 of the locking portion 98 with the lip 20 of the cover panel 70, outwardly extending tabs, such as tabs 106, 108 can be formed on the distal end 104 of the locking portion 98, the tabs 106, 108 being compressed and frictionally engaging a portion of the lip 20 of the cover panel 70 when the locking portion 98 is in its assembled, folded position so as to substantially encapsulate the flap portions 90, 92 of the cover end walls 72, 74 as heretofore described.

If desired, a suitable adhesive material, such as a mastic, glue, or tape can be employed to seal each of the joints formed in the formation of the cover member 14, as well as the junction between the cover end wall 72 and 74 of the cover member 14 with the container end walls 32, 34 of the bottom container 12, and the cover side wall 76 of the cover member 14 to the container side wall 36 of the bottom container 12. However, it should be noted that because of the unique structure of the disposable animal litter box, one does not need to employ such adhesive materials to secure the various components of the cover member 14 or for sealing the cover member 14 to the bottom container 12.

When the various components of the cover member are sealed using a sealing constituent, such as glue, mastic, or tape, and the cover member 14 is sealed to the bottom container 12, litter material can be sealed within the cavity formed in the bottom container 12 prior to sealing the cover member 14 to the bottom container 12 so that upon removal of the selectively removable portion 16 from the cover panel 70 the disposable animal litter box is ready for use. In the alternative, in such instance where the components of the cover member 14 are sealed together, as well as the cover member 14 being sealed to the bottom container 12, a package of litter material sealed in a package consisting of a paper or plastic bag may be positioned within the cavity of the bottom container 12 prior to sealing the cover member 14 to the bottom container 12 so that upon removal of the selectively removable portion 16 from the cover panel 70, the bag containing the litter can be opened and the litter material placed in the bottom container. However, in those instances where one does not desire to package litter within the disposable animal litter box during shipping and marketing of the disposable animal box 10, one does not need to seal the various components forming the cover member 14 or seal the cover member 14 to the bottom container 12 because the construction of the disposable animal litter box 10 is such that it can readily be placed into service without such components being sealed together.

It is clear that the present invention is well adapted to carry out the objects and attain the ends and advantages mentioned herein as well as those inherent in the invention. While a presently preferred embodiment of the invention has been described for purposes of this disclosure, numerous changes may be made which will readily suggest themselves to those skilled in the art and which are accomplished within the spirit of the invention disclosed and as defined in the appended claims.

What is claimed is:

1. A disposable animal litter box fabricated as a unitary component and having its internal surface treated with a urine repellant material, the disposable animal litter box comprising:
   a substantially fluid-tight bottom container having a bottom panel, substantially parallel container end walls connected to two opposite edges of the bottom panel so as to be substantially normally disposed to the plane of the bottom panel, substantially parallel container side walls connected to the other two opposite edges of the bottom panel so as to be substantially normally disposed to the plane of the bottom panel, the container side walls extending from the bottom panel in the same direction as the container end walls, and foldable corners interconnecting the end portions of the container end walls with adjacently disposed end portions of the container side walls;
   a cover member supported by the bottom container, the cover member having a selectively removable portion formed therein for defining an opening and providing an animal supporting lip in the cover member encompassing the opening, the removable portion being repositionable with the opening for frictionally engaging the lip of the cover member defining the opening for disposal of the animal litter box and its contents; and
   connecting means for connecting the foldable corners of the bottom container to the bottom container end walls and the cover member, the foldable corners forming an internal support for the lip of the cover member such that the lip is capable of supporting the weight of an animal thereon.

2. The disposable animal litter box of claim 1 wherein the cover member comprises:
   a cover panel connected to an edge of one of the container side walls, the cover member containing the selectively removable portion so as to define the opening in the cover panel;
   substantially parallel cover end walls connected to two opposite edges of the cover panel, the cover end walls being substantially normally disposed to the plane of the cover panel; and
   a cover side wall connected to a distal edge of the cover panel so as to extend therefrom in the same direction as the cover end walls and be substantially normally disposed to the plane of the cover panel such that in an assembled position the cover end walls and the cover side wall matingly engaging the adjacently disposed container end walls and one of the container side walls.

3. The disposable animal litter box of claim 2 wherein each of the cover end walls has a flap portion extensive from the end adjacent the cover side wall, the flap portions being foldable to extend beneath at least a portion of the lip of the cover panel substantially adjacent the cover side wall; and wherein the cover side wall has a locking portion foldable along the length of the cover side wall such that the locking portion is foldable over the cover end wall flap portions when the flap portions are in the folded position, the locking portion dimensioned so as to be retained in a locked position by frictional engagement of a distal end of the locking portion with the lip of the cover panel disposed substantially adjacent the cover side wall.

4. The disposable animal litter box of claim 3 wherein the locking portion is provided with a plurality of tab extensions extending from a distal end of the locking portion, the tab extensions frictionally engaging the portion of the lip of the cover panel disposed substantially adjacent the cover side wall for retaining the locking portion in a secured position.

5. The disposable animal litter box of claim 4 further comprising:
   an absorbent filler material disposed within the bottom container so as to fill at least a portion of the cavity defined by the bottom container.

6. A disposable animal litter box comprising: a bottom panel;
   bottom panel end walls connected to opposite edges of the bottom panel so as to be substantially parallel with one another and substantially normally disposed to the plane of the bottom panel;

bottom panel side walls connected to the other two opposite edges of the bottom panel so as to be substantially parallel with one another and substantially normally disposed to the plane of the bottom panel, the bottom panel side walls extending from the bottom panel in the same direction as the bottom panel end walls;

foldable corners interconnecting end portions of the bottom panel end walls with adjacently disposed end portions of the bottom panel side walls so as to form a substantially fluid-tight bottom container having a litter receiving cavity;

a cover panel connected to an edge of one of the bottom side walls, the cover panel having a selectively removable portion formed therein so as to define an opening therein and provide a lip encompassing the opening upon removal of the removable portion;

substantially parallel cover end walls connected to two opposite edges of the cover panel so as to be substantially normally disposed to the plane of the cover panel;

a cover side wall connected to a distal edge of the cover panel so as to extend therefrom in the same direction as the cover end walls and be substantially normally disposed to the plane of the cover panel, the cover end walls and the cover side wall being adapted to matingly engage the adjacently disposed end walls and the side wall of the bottom panel; and connecting means for connecting the foldable corners to the bottom panel end walls of the bottom container, the cover end walls to the bottom end walls, and the cover side walls to the adjacently disposed bottom panel side walls such that the foldable corners are disposed under a portion of the lip of the cover member and form an internal support for the lip of the cover member.

7. The disposable animal litter box of claim 6 wherein each of the cover end walls has a flap portion extensive from the end adjacent the cover side wall, the flap portions being foldable to extend beneath at least a portion of the lip of the cover panel disposed substantially adjacent the cover side wall; and wherein the cover side wall has a locking portion foldable along the length of the cover side wall such that the locking portion is foldable over the cover end wall flap portions when the flap portions are in the folded position, the locking portion dimensioned so as to be retained in a locked position by frictional engagement of a distal end of the locking portion with the lip of the cover panel disposed substantially adjacent the cover side wall.

8. The disposable animal litter box of claim 7 wherein the bottom container and the cover member are fabricated as a unitary component of paperboard treated on its internal surface with a urine repellant material.

9. The disposable animal litter box of claim 8 further comprising:

an absorbent filler material disposed within the bottom container so as to fill at least a portion of the cavity formed in the bottom container.

* * * * *